(12) United States Patent
Pattabhiraman et al.

(10) Patent No.: US 10,839,322 B2
(45) Date of Patent: *Nov. 17, 2020

(54) TAG-BASED PERFORMANCE FRAMEWORK FOR CONTACT CENTER

(71) Applicants: GENESYS TELECOMMUNICATIONS LABORATORIES, INC., Daly City, CA (US); Nokia of America Corporation, Murray Hill, NJ (US)

(72) Inventors: Ramesh V Pattabhiraman, New Albany, OH (US); Andriy Vladimirovich Ryabchun, Mill Valley, CA (US); Geeta Chauhan, Santa Clara, CA (US); Josef Eric Eisner, Larkspur, CA (US)

( * ) Notice: Subject to any disclaimer, the term of this patent is extended or adjusted under 35 U.S.C. 154(b) by 253 days.

This patent is subject to a terminal disclaimer.

(21) Appl. No.: 15/796,542

(22) Filed: Oct. 27, 2017

(65) Prior Publication Data

US 2018/0053125 A1    Feb. 22, 2018

Related U.S. Application Data

(63) Continuation of application No. 14/192,843, filed on Feb. 27, 2014, now Pat. No. 9,805,320.

(51) Int. Cl.
*G06F 16/00* (2019.01)
*G06Q 10/06* (2012.01)
*G06Q 10/10* (2012.01)

(52) U.S. Cl.
CPC ..... *G06Q 10/06* (2013.01); *G06Q 10/063116* (2013.01); *G06Q 10/10* (2013.01)

(58) Field of Classification Search
CPC ......... G06F 16/24549; G06F 16/24534; G06F 16/2462; G06F 16/2453; G06F 16/2471; G06F 16/2458; G06F 8/35; G06F 8/31; G06F 8/34; G06F 3/167; G06F 17/278; G06F 8/40; G06F 11/3664;
(Continued)

(56) References Cited

U.S. PATENT DOCUMENTS 6,175,564 B1    1/2001   Miloslavsky et al.
6,778,643 B1 *  8/2004   Bushey .................... G06F 8/20
                                                      379/112.06
(Continued)

OTHER PUBLICATIONS

Ashwin, A.S.; Bridging Institutional Voids through New Services: Case Studies and Analysis, 2012 Third International Conference on Services in Emerging Markets, Dec. 12-15, 2012, Mysore, 8 pages.
(Continued)

*Primary Examiner* — Anh Ly

(57) ABSTRACT

An apparatus includes a processor and a memory. The memory stores instructions that when executed by the processor cause the processor to: identify a keyword from machine-readable text; identify a contact center resource based on the identified keyword; update a first group of keywords associated with the contact center resource based on the identified keyword; invoke an action based on analysis of the keyword associated with the contact center resource; monitor the action and report results in response; and update a second group of keywords according to analysis of the results.

20 Claims, 10 Drawing Sheets

(58) Field of Classification Search
CPC .... G06F 11/3668; G06F 8/4441; G06F 16/00; G06F 17/30474; G06F 17/30; G06F 16/24535; G06F 16/93; G06F 16/248; G06F 17/30011; G06F 17/30598; G06F 17/3053; G06Q 10/06; G06Q 10/063116; G06Q 10/10; H04L 29/06; H04L 3/4441; H04L 51/14; H04L 3/62; H04M 3/5183

See application file for complete search history.

(56) References Cited

U.S. PATENT DOCUMENTS

| | | | |
|---|---|---|---|
| 8,078,486 B1 | 12/2011 | McLean et al. | |
| 8,326,643 B1 | 12/2012 | Eshkenazi et al. | |
| 8,537,983 B1* | 9/2013 | Haggerty | H04M 3/51 379/88.14 |
| 8,644,488 B2 | 2/2014 | Byrd et al. | |
| 8,649,499 B1 | 2/2014 | Koster et al. | |
| 8,706,689 B1 | 4/2014 | Adam | |
| 8,798,241 B2 | 8/2014 | Sigmund et al. | |
| 8,989,713 B2 | 3/2015 | Doulton | |
| 9,020,134 B1* | 4/2015 | McCormack | H04M 3/5175 379/265.02 |
| 9,020,920 B1 | 4/2015 | Haggerty et al. | |
| 9,020,929 B2* | 4/2015 | Santosuosso | G06F 16/24565 707/713 |
| 9,083,806 B2 | 7/2015 | McCormack et al. | |
| 2003/0174830 A1* | 9/2003 | Boyer | H04M 3/51 379/265.02 |
| 2004/0249636 A1* | 12/2004 | Applebaum | G10L 15/1822 704/231 |
| 2004/0249650 A1 | 12/2004 | Freedman et al. | |
| 2005/0114379 A1 | 5/2005 | Lee | |
| 2005/0163304 A1* | 7/2005 | Judkins | H04M 3/523 379/265.02 |
| 2005/0283475 A1* | 12/2005 | Beranek | |
| 2006/0109975 A1* | 5/2006 | Judkins | H04M 3/5233 379/265.02 |
| 2007/0081636 A1 | 4/2007 | Shaffer et al. | |
| 2007/0121824 A1* | 5/2007 | Agapi | H04M 3/5175 379/88.18 |
| 2008/0003964 A1 | 1/2008 | Alperin et al. | |
| 2008/0033970 A1 | 2/2008 | Jones et al. | |
| 2008/0162701 A1 | 7/2008 | Ryabchun et al. | |
| 2008/0195659 A1* | 8/2008 | Rawle | G06Q 90/00 |
| 2008/0260128 A1* | 10/2008 | Conway | H04M 3/5232 379/201.02 |
| 2008/0263458 A1 | 10/2008 | Altberg et al. | |
| 2009/0003566 A1 | 1/2009 | Wentink | |
| 2009/0210228 A1* | 8/2009 | George | H04M 3/4936 704/251 |
| 2009/0327488 A1 | 12/2009 | Sampat et al. | |
| 2010/0104086 A1* | 4/2010 | Park | G10L 15/04 379/265.09 |
| 2010/0169340 A1 | 7/2010 | Kenedy et al. | |
| 2010/0332477 A1* | 12/2010 | Jeffs | G06Q 30/02 707/738 |
| 2011/0125793 A1* | 5/2011 | Erhart | H04L 51/32 707/776 |
| 2011/0178797 A1 | 7/2011 | Markefka et al. | |
| 2011/0206198 A1 | 8/2011 | Freedman et al. | |
| 2012/0020473 A1 | 1/2012 | Mart et al. | |
| 2012/0101873 A1 | 4/2012 | Lepore et al. | |
| 2012/0185484 A1 | 7/2012 | Jones et al. | |
| 2013/0016115 A1* | 1/2013 | Minert | H04N 7/167 345/589 |
| 2013/0051548 A1* | 2/2013 | Chavez | G06Q 10/101 379/265.09 |
| 2013/0165086 A1 | 6/2013 | Doulton | |
| 2014/0093062 A1* | 4/2014 | McCormack | H04M 3/5233 379/265.12 |
| 2014/0140497 A1* | 5/2014 | Ripa | H04M 3/5133 379/265.06 |
| 2014/0282217 A1* | 9/2014 | Musa | G06F 3/0481 715/781 |
| 2014/0362984 A1 | 12/2014 | Danson et al. | |
| 2014/0370479 A1* | 12/2014 | Gazzaley | A61B 5/162 434/322 |
| 2015/0032452 A1 | 1/2015 | Lev-Tov et al. | |
| 2015/0071418 A1 | 3/2015 | Shaffer et al. | |
| 2015/0098560 A1* | 4/2015 | McCormack | H04M 3/5175 379/265.06 |
| 2015/0100528 A1* | 4/2015 | Danson | G06N 5/04 706/21 |

OTHER PUBLICATIONS

International Search Report and Written Opinion of the International Searching Authority for PCT/US2015/018139, dated May 27, 2015, 11 pages.

Marinovic, Igor et al., Content-based Image Retrieval, 2008 6th International Symposium on Intelligent Systems and Informatics, Sep. 26-27, 2008, Subotica, 6 pages.

* cited by examiner

TAG-BASED PERFORMANCE FRAMEWORK FOR CONTACT CENTER

CROSS-REFERENCE TO RELATED APPLICATION(S)

This application is a continuation of U.S. patent application Ser. No. 14/192,843, filed on Feb. 27, 2014, now U.S. Pat. No. 9,805,320, the content of which is incorporated herein by reference.

BACKGROUND

1. Field

The present invention is in the field of telecommunications and pertains particularly to methods and apparatus for optimizing contact center operations through a tag-based operational framework.

2. Discussion of the State of the Art

Contact centers are utilized by corporations and other businesses to interact with customers of contracting entities to fulfill their needs relative to customer service, transacting, and client development. A typical contact center conducts business with customers through myriad different channels of interaction. Therefore, it is desirable for contact centers to be equipped to handle data in various formats that are both structured and unstructured.

Contact centers today may use various ad-hoc strategies for interpreting customer needs and fulfilling customer requests. While a contact center may be adapted to handle various communications channels and formats, it may not inherently be equipped to collect and derive information in a manner that it can be used at any stage of a contact center operation such as during an interaction or during other operations that may be performed in real time.

Therefore, what is clearly needed is a tag-based operation performance framework for a contact center. Such a framework would encourage enhanced customer experience, more efficient operations, and a capability of deepening insights into the business conducted through the center.

SUMMARY

According to one embodiment, an apparatus includes a processor and a memory. The memory stores instructions that when executed by the processor cause the processor to: identify a keyword from machine-readable text; identify a contact center resource based on the identified keyword; update a first group of keywords associated with the contact center resource based on the identified keyword; invoke an action based on analysis of the keyword associated with the contact center resource; monitor the action and report results in response; and update a second group of keywords according to analysis of the results.

According to one embodiment, the second group of keywords is associated with a contact center client, the contact center resource, or a second contact center resource.

According to one embodiment, the text is derived from a communication session between a client and the contact center resource wherein the instructions further cause the processor to tag the communication session based on the identified keyword.

According to one embodiment, the text further includes text associated with a communication session between the contact center resource and a supervisor of the contact center.

According to one embodiment, the text is converted from an audio recording.

According to one embodiment, the contact center resource is a contact center agent, contact center product, or contact center service.

According to one embodiment, the action is at least one of routing a call, routing a message, or generating statistics.

According to one embodiment, the instructions further cause the processor to search to discover entities based on the identified keyword.

According to one embodiment, the action includes inferring relationships between certain entities based on similarity evidenced through comparing associated keywords attributed to those entities.

According to one embodiment, the keyword reflects a skill possessed by a contact center agent.

According to one embodiment, the action includes providing search engine functionality to discover problem interactions based on the keyword.

According to one embodiment, the keyword reflects sentiment or mood of a contact center client or contact center agent.

According to one embodiment, the action includes inferring an interaction topic based on historical record of frequency of use of the keywords relative to those topics.

DETAILED DESCRIPTION

In general terms, embodiments of the present invention are directed to a unique tag-centric framework for driving service-centered businesses such as contact center services. Embodiments of the present invention are described in enabling detail using the following examples, which describe more than one relevant implementation falling within the scope of the present invention.

Figure 1:
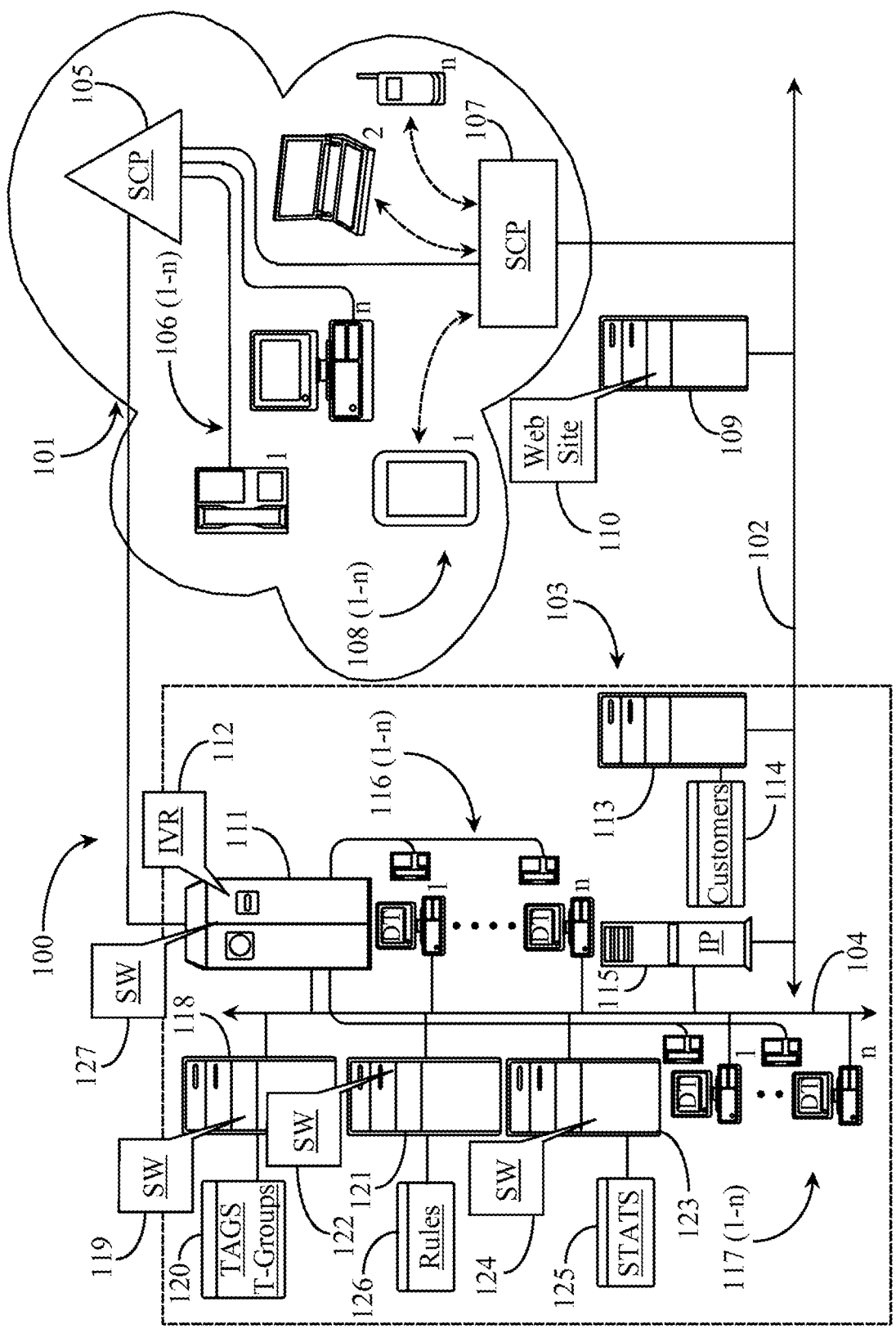
FIG. 1 is an architectural diagram of a service network supporting a tag-centric framework contact center operations.

FIG. 1 is an architectural diagram of a service network 100 supporting a tag-centric framework contact center operations. Network 100 may be a service network such as a contact center service network. Network 100 may include one or more service domains such as a contact center 103 bounded by a broken rectangle. Network 100 may include an Internet network segment depicted herein as network backbone 102. Backbone 102 may represent all of the lines, equipment, and access points of the Internet network as a whole, including connected sub-networks. Therefore, there may be no geographic limitations to the practice of the present invention.

Contact center domain 103 may include a local area network (LAN) depicted herein as LAN backbone 104. LAN 104 may support contact center equipment including switches, routers servers, computers, and automated services such as interactive voice response. Contact center 103 may have a Web site 110 depicted herein as running on a Web server 109 connected to backbone 102 outside of the physical domain of the contact center. Website 110 may be presented as an access point for network-connected clients to access services available through contact center 103. Web site 110 may include access points to various contact center services such as sales, technical service, contact center blogs, product descriptions, service descriptions and problem resolution services among others.

Network 100 includes a carrier network 101, which broadly represents any connected sub-network through which a customer might access the call center. Network 101 may be a public switched telephone network (PSTN) or a wireless carrier network. Both wireless and wired communication is represented in this example. Customers 106 (1-*n*) and customers 108 (1-*n*) may access contact center services from network 101 through service control point 105 or service control point 107. Customers 106 (1-*n*) represent customers connecting to contact center services by wire. Customers 108 (1-*n*) represent customers connecting to contact center services by wireless protocol.

Service control point 107 has connection to backbone 102 and may provide wireless Internet connection between customers 108 (1-*n*) and Web server 109, more specifically, Website 110. Contact center 103 may include an Internet protocol (IP) router 115 for routing data from Internet 102 onto LAN 104 to various service destinations including a universal routing server 121. It is noted herein that each server representation in this example may be assumed to have access to at least one processor, at least one data repository, and a non-transitory physical medium supporting running software instances, which are described in more detail later in this specification.

Service control point 105 has connection to a telephony switch 111 within the domain of center 103. Switch 111 may be adapted to interact with customers using interactive voice response (IVR) services depicted herein as IVR 112. Callers accessing services by telephone such as customer 106 (1) may be connected to switch 111 and IVR 112 to determine caller identification and intent (reason for calling) so correct routing may be provided if required. Service control point 105 also has a logical connection to service control point 107, in this example, to facilitate Web access for customer 106 (*n*) operating a wired desktop computer. Service control point 107 may be adapted to handle both wired and wireless callers.

Switch 111 may, in one example, be adapted to receive both telephony calls and IP calls. Switch 111 has connection to LAN 104 inside the call center. Contact center 103 may include a number of agent stations 116 (1-*n*) representing call center agents active and ready to take calls. Each agent station 116 (1-*n*) may include a desktop computing appliance connected to LAN 104 within the call center domain. Each agent station may include a standard telephone connected to switch 111 by telephone wire. LAN 104 supports a number of supervisor stations 117 (1-*n*). Supervisor stations 117 (1-*n*) may each include a LAN-connected computer and a telephone connected to switch 111.

Contact center 103 may include a customer information server 113. Customer information server 113 has connection to a data repository 114 containing information about customers serviced by contact center 103. Universal routing server 121 has connection to LAN 104 and may provide routing strategies for routing calls and messages to agents and automated services. Contact center 103 may include a statistics server 123. Statistics server 123 has connection to LAN 104 and may provide statistical information about sales, agent performance, customer behaviors, and statistics relative to other business categories.

Server 123 has connection to a data repository 125 containing statistics. Universal routing server 121 has connection to a data repository containing business rules relative to routing and other procedures and services that might be offered in the contact center. Contact center 103 includes a tag server 118. Tag server 118 has connection to LAN 104 and maintains and serves tags upon request.

According to at least one implementation a tagging framework is provided that is the driving layer of multiple disparate contact center operations including at least routing, workforce management, campaign management, customer relations (billing), product management, transaction services, and technical services. The tagging framework may be represented by distributed software instances like software 119 executing from tag server 118; software 122 executing from universal routing server 121, software 124 executing from statistics server 123; and software 127 executing from switch 111.

Software 127 executing from switch 111 may work in conjunction with IVR 112 to perform auto-tagging based on primary keyword extractions from parsed content. The content may be voice content transcribed to text, which may then be parsed for primary keywords that can be used as tags by the system for routing purposes. Software 127 may auto-tag any interaction at switch 111 based on keyword extraction. Tags assigned to interactions may be used to optimize routing strategies. Tags may be derived for mood or sentiment and assigned to the interaction. SW 119 may organize and maintain tags assigned to various entities involved in contact center operations. SW 119 may serve tags and tag clouds upon request. SW 119 may also include a search engine adapted to enable agents, supervisors, and in some cases customers to search for entities based on tags, or to search for tags based on entity. SW 119 may also maintain and organize tag groups for entities and may serve different views of tags and tag groups to knowledge workers or supervisors accessing the information from desktop applications.

Agent stations 116 (1-*n*) may have desktop (DT) applications for managing the numerous interactions and tasks the agent is responsible for. These applications may include interfacing components for communicating with tag server 118 and software 119 for tasks like tag search, entity search, manual tagging, and tag management including purging, updating, and correcting tags. For example, an agent may tag herself with an interaction tag from an interaction the agent handled. Monitoring applications (not illustrated) responsible for recording transactions and other interactions between agents and customers may also auto tag entities defined as agents and customers. As tags accumulate for an entity, the tag list may be transformed into an interactive tag cloud at server 118.

Software 122 executing from routing server 121 may work in conjunction with software 127 and software 119. Software 122 may provide routing instructions for routing interactions based on tags assigned to the interaction from the point of initiation of the interaction and during the interactive session. For example, a session may include more than one routing event and may involve more than one entity, which may be a live person or a service. Routines for routing based on tag assignment may be selected and returned based on the tag or tags assigned to interactions, agents, and other entities like an automated service. Rules may be provided to mediate routing decisions, the rules depicted in a rules database 126 connected to server 121. Software 121 may work in conjunction with routing software and may auto tag entities where appropriate during the routing process of an interaction and after the routing has been executed.

Software 124 executing from server 123 may work in conjunction with software 122, software 119, and software 127 to provide current statistical information about tag usage, tag migration, tag cloud evolution, and other states involving tag-driven processes. Supervisor stations 117 (1-*n*) may use desktop (DT) applications to manage workforce issues, product management issues, and sales campaign issues through interaction with server 123 and software 124. Updated and current statistics may be stored and managed in a statistics repository 125. The tag framework may be exemplified logically through software 127, 119, 122, and 124. According to one embodiment, the tag-centric framework is adapted to work in all of various important contact center business layers.

Additional software components of the tag framework may be provided to other servers such as customer information server 113, a dedicated email or message routing server, a chat server, a product information server, and so on. Extensions and plug-ins may be provided to desktop applications such as sales force applications, desktop routing applications, and social interaction interfaces. A statistical analysis interface might be provided in a standalone fashion or might be integrated with a desktop application. Such an interface may include options for reviewing general statistics about tags, most recent statistics about tags, and most active statistics related to tags. A supervisor or business analyzer may determine the number of unique tags (tags that are unique to one entity) verses total tags for the same entity. For example, there may be X number of total tags for all agents and Y number of unique tags determined to be unique to the entity. In one implementation tags may be assigned to Web visitors based on their behaviors at the Website. The tagging server may infer or assign several tags to a Web visitor based on understanding of the customer's navigation behaviors and click patterns.

In use of the present invention, different entities within the center including agents, customers, interactions, products, services, departments, groups, etc. may have multiple assigned tags which may be leveraged to drive different contact center tasks such as routing, workforce management, data mining, data analysis, shipping, transacting, customer management, campaign management, and any other contact-center process involving tagged entities. Tags can be grouped based on role, skill, or on any criteria. Tags can be absorbed into higher-order tags as the system discovers new keywords that may be used to tag entities. New tags may be migrated into skills and skill-groups as the system learns.

Tags may be leveraged as an adaptive skill-based routing strategy in the contact center environment. Tags may be leveraged to group agents, content, etc. by analyzing the relationships between the tags. Tag exception lists might be created for auto-tagging and manual tagging operations so that the system knows what tags it cannot tag an entity with. The same list might be used to suggest to a user that the tag you are applying should not be used.

A customer can be prompted to provide a brief description of their problem; the recorded content can be transcribed. The tags derived from this transcript can then be used to provide auto-suggestions to the agent based on associated knowledge management categories to prepare the agent to address the customer problem quickly.

Interactions handled generally by agents may be auto-escalated to supervisor agents for faster resolution depending on tag groups like sentiment, category, or certain types of problems in combination with other contextual information such as customer segment. In one implementation supervisory agents may be presented with dashboard views of tag clouds derived from tags associated with interactions as they occur in the system in real time. Supervisors may quickly identify and isolate problem interactions or emerging trends from large batches of interaction transcripts. New skills patterns may evolve in the system as tags are assigned to agents as they handle interactions or transfer interactions to other agents. Such patterns may be viewed in real time by supervisor agents via a dashboard type view using a desktop monitoring application.

Figure 2:
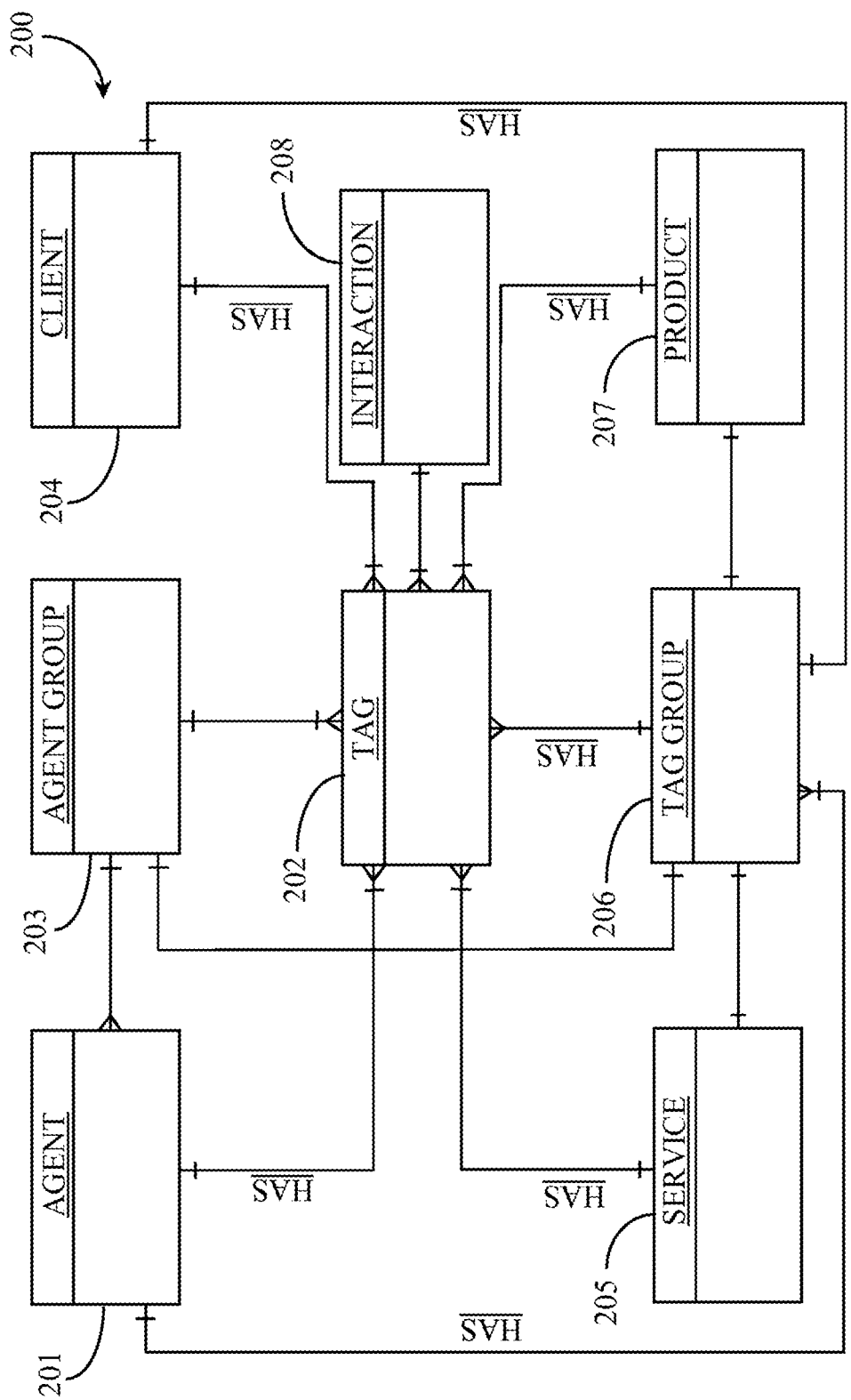
FIG. 2 is an entity relationship model depicting entities and their tag relationships.

FIG. 2 is an entity relationship model 200 depicting entities and their tag relationships. Model 200 is centered on tag 202. Basic entities that may be managed and accessed through tags include an agent 201, an agent group 203, a client 204, a service 205, a product 207, and an interaction 208. It is noted herein that model 200 represents a basic tag-centric model that may be used to define the tag-based relationships for the entities. More entities might be added to model 200 without departing from the spirit and scope of the present invention such as different contact center equipment groupings, home-based agents, established departments, human resources personnel, supervisors, and so on.

One agent 201 may have one or more than one assigned tag 202. One agent 201 may have one, or more than one, tag group 206. One tag group 206 has multiple tags. For example, a tag group for an agent may be created relevant to a specific task of an agent like "technical servicing" versus "product sales". A complete list of tags for an agent may be migrated or organized into separate groups related to different tasks where the agent may have different attributes or skills related to the specific task a tag group might be generated for. Many of the same tags may be repeated in these separate groups and each group may also have tags unique to that group. A tag hierarchy might be "all tags for an agent"; "all tag groups for an agent"; and "single tag group for an agent". A tag group may be represented as an interactive "tag cloud" display.

An agent group 203 is made up of more than one agent 201. An agent group 203 may have one or more than one tag 202. An agent group 203 may also have a tag group 206. One service 205 may have one or more than one tag 202. One service 205 may have one tag group 206. One product 207 may have one or more than one tag 202. One product 207 may have one tag group 206. One client or customer 204 may have one or more than one tag 202. One client 204 may have one tag group 206. One interaction 208 may have one or more than one tag. An interaction most likely will not have an organized tag group. The tags assigned to interactions aid in immediate routing and may also be used to make suggestions to an agent for upsell, or some other process that may be initiated during the interaction or session between the customer and the agent.

Each of the entities in this model may be discovered by leveraging one or more tags as search input. Interactions may be routed to entities such as an agent, an agent group, or an automated service or department using tags attributed to interactions after point of initiation to determine the best routing strategy. Tags may be automatically and manually assigned to entities depending upon the circumstances. The tagging framework may self maintain and evolve upon introduction and discovery of new information. Obsolete tags may be purged from the system and new tags may be added. The system may consult rules relative to tag-centric tasks like in routing for example. For example, the tag groups of two separate agents may be compared to determine if an interaction tag such as hardware problem might be relative to the same or similar tag in each of the agents tag groups. If the tag is found in both tag groups, the system may determine number of instances the tag has been used by the agents. The agent with the most usage of the tag hardware problem might be the best agent to route the interaction to given both agents are available.

Figure 3:
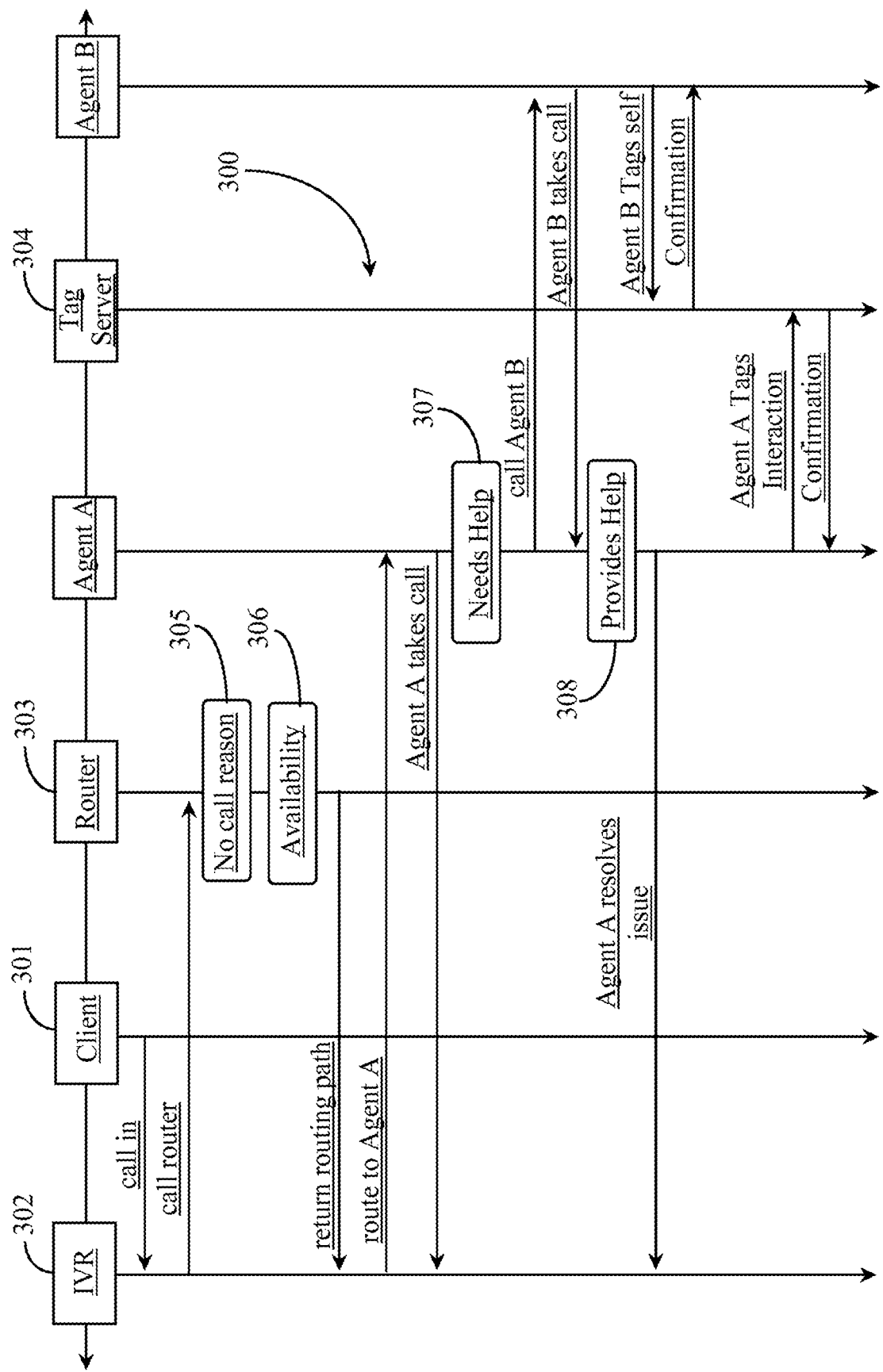
FIG. 3 is a flow sequence chart depicting a routing sequence based on tags.

FIG. 3 is a flow sequence chart 300 depicting a routing sequence resulting in tag addition. Chart 300 depicts an IVR 302 (incorporated into, or working in conjunction with, a switch), a client or customer device 301, a router 303, a tag server 304, and Agent A and Agent B. These entities are analogous to those described in FIG. 1 of the same name. Client 301 may call in to the contact center with a technical issue related to hardware and may be intercepted by IVR 302. IVR 302 may determine during interaction that the client is a first time caller and not previously known as a customer of the enterprise. IVR 302 may request routing information from router 303 to best route the call.

In this implementation the router may find that there is not sufficient data to determine a best-fit agent for routing purposes at act 305. The router may simply check availability for any agent at act 306. Router 303 may determine an available agent and may return the appropriate destination path to IVR 302. The call may be routed in this case to agent A being the next available agent in the agent queue that can take the call. In this implementation agent A determines the caller's intent (reason for the call). Agent A takes the call. Agent A may determine after discerning the reason for the call at act 307, that the caller has a specific "hardware problem" that may require expertise of another agent to solve. In other words the agent may need the help of yet another agent to resolve the caller's issue with hardware.

Agent A may call agent B while the caller is on hold or is conferenced in. Agent B may take the call and may have the skills to help agent A solve the problem and may provide the needed help at act 408. Agent A may then resolve the issue with the client. Agent B may tag herself with a new tag "hardware problem". This may be accomplished through a desktop interface connected to tag server 304. The desktop interface may be invoked to provide data on the new tag to be generated. Tag server 304 receives a request to add the new tag from Agent B, identifies the target of the tag (e.g. based on identifying the source of the request), and adds the particular tag to Agent B. The tag server 304 may serve confirmation of the new tag addition for agent B and the tag may be added to the agent's tag cloud for future reference. Agent A may tag the interaction with the same tag "hardware problem" for reporting and archiving purposes.

Figure 4:
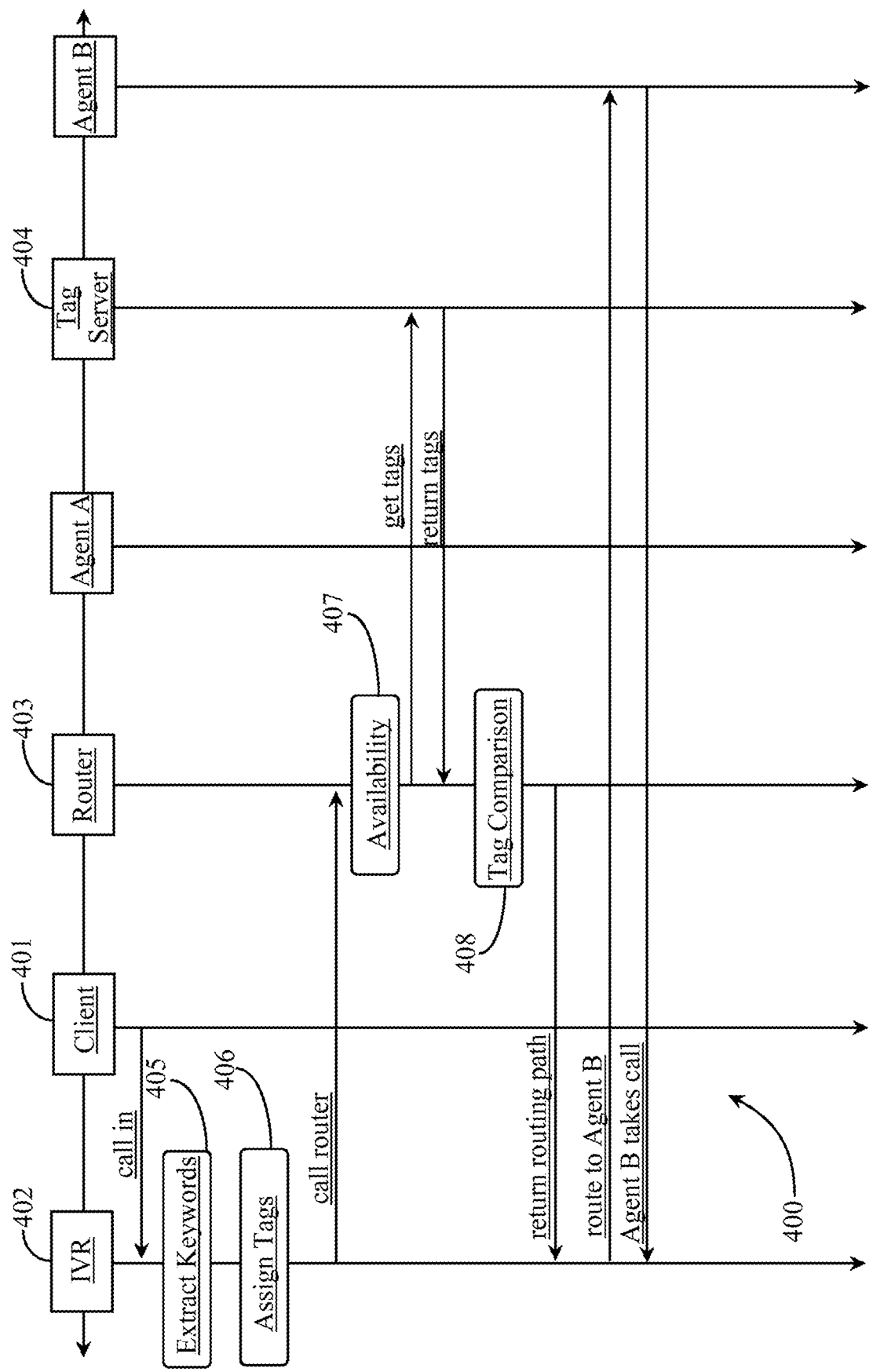
FIG. 4 is a flow sequence chart depicting a routing sequence resulting in new tagging.

FIG. 4 is a flow sequence chart 400 depicting a routing sequence based on tags. Chart 400 depicts an IVR 402, a client 401, a router 403, a tag server 404, and an agent A, and an agent B. These entities are analogous to those described in FIG. 1 of the same name. Client 401 may call into the IVR using a telephone or telephony voice application. During interaction with the IVR, the audio or voice interaction, or touch tone responses may be transcribed to or represented as parse-able text. The text may represent a transcript of the IVR interaction. Metadata previously known about the client, antidotal markup language or other system notation may accompany the text and be included for keyword extraction. IVR 402 may also identify the caller and see if there are any tags assigned to the customer responsible for the call. The caller may also be a first time caller who is not pre-known to the system.

In this implementation the IVR, with the aid of software 127 (FIG. 1) may extract keywords from the transcribed IVR session in act 405. The IVR may auto assign one or more tags to the interaction focusing on the most primary of the keywords. The IVR may also assign a tag that reflects mood or sentiment if mood detection capability is available to the IVR. For example, suppose the customer called in about a "hardware problem" with a recently purchased computing appliance, and the customer is incensed or angry about the problem. The IVR with the aid of software may assign the tags "hardware problem" and "customer frustration" to the interaction in act 406. It is noted herein that keyword extraction and auto-tagging entities may be performed by the routing server instead of at the IVR.

The IVR has first access to the customer and is therefore a logical point to distribute the software capabilities of transcription parsing, keyword extraction, and auto-tagging. The IVR may send the interaction transcription and any customer tags to router 403 in a routing request (call router). Router 403 may receive the data from the IVR interaction and may first check if there any available agents to route the call to in act 407. Agent A and Agent B may both be available for receiving the interaction in this implementation. The router 403 may receive one or more interaction tags assigned to the interaction in act 406. Router 403 may call tag server 404 to search agent tags that might match the assigned interaction tags. The assigned tags may be used as query input.

Tag server 404, may perform the search against its tag database and may return a tag cloud, group, or list of tags associated with the available agents A and B. Router 403 may receive the tag clouds and may perform an algorithmic a tag comparison in act 408 of the agents' tags in light of the received interaction tags. The result may be that Agent B analogous to agent B in FIG. 3 above has the tag "hardware problem" while agent A does not. The result may also be that both agents have the tag "hardware problem", but one of the agents may be better equipped to handle the interaction based on the presence of or usage statistics of the matched tag or tags. A same tag "hardware problem" which might be in the tag clouds of both agents may have been assigned manually or automatically multiple times to one agent whereas the other agent has only received the tag assignment once or fewer times. Here the criterion for tagging the agent might be tag once every time the agent successfully handles an interaction about a hardware problem with this type of computing appliance.

The router may select the agent with more "tag instance prevalence" for the interaction tag "hardware problem" based on the assumption that agent B, for example, has more experience in solving the hardware problem and is therefore the best agent of the two available agents to route the interaction to. Router 403 may select Agent B for the interaction and may return the interaction routing path to the IVR where the interaction is parked. IVR 402 may then route the interaction to Agent B, and Agent B may take the call.

This simple strategy may be based on the number of instances an agent has been tagged with the matching tag to determine experience level associated with the tag or tag category with the assumption that the agent with the most instances of that tag naturally has more experience. Business rules governing tagging and routing based on tags may be consulted during the process. For example, if agent B has more experience than agent A in "hardware problem", but agent A is better than agent B at calming a customer with frustration "customer frustration" then the call might be routed instead to agent A depending upon rules and one or more tags in the cloud of agent A that may indicate customer soothing skills like "calm demeanor", "conflict resolution", etc. Therefore, tags that reflect a mood like anger, frustration, distrust, etc. that might be auto tagged to an interaction may be matched to antonym tags found in tag clouds of the agents that reflect the agents' skills for handling such customer sentiments or mood states.

It is noted herein that tags assigned to agents may be auto-assigned based on successful interaction resolutions, or other successful agent duty performance results. Tags may also be manually assigned to agents by the agents themselves or by other qualified individuals like agent supervisors. In one implementation agents who have some performance issues may also be tagged with negative tags that might temporarily prevent them from getting some calls until the issue the tag addresses is minimized or resolved. For example, if two agents compete for calls where commission or bonus is earned for number of calls handled successfully, a negative tag may reduce commissions for one of the competing agents and boost them for the other.

Figure 5:
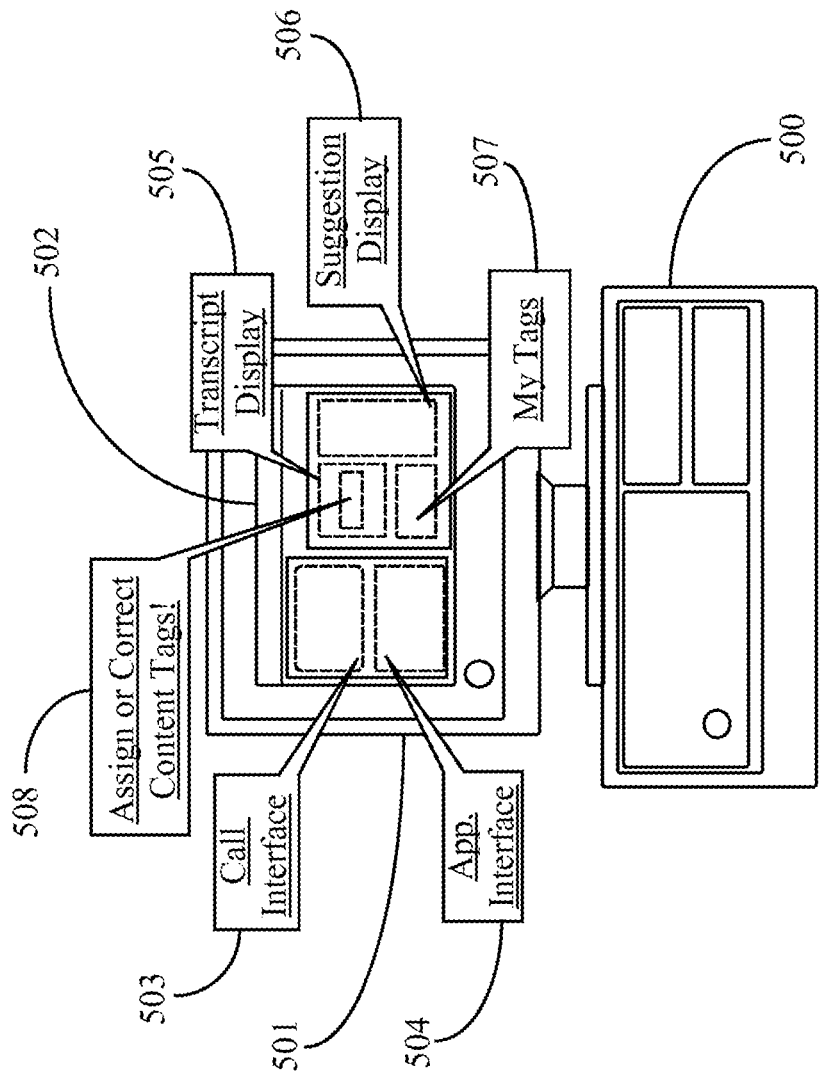
FIG. 5 is an elevation view of an agent desktop computer running a desk top application adapted for working with tags.

FIG. 5 is an elevation view of an agent desktop computer 500 running a desk top application adapted for working with tags. Computer 500 is analogous to a LAN-connected computer associated with any of agent stations 116 (1-*n*) of FIG. 1. Computer 500 includes a display monitor 501 as is typical in the art. In this implementation a desktop agent application 502 is provided to the agent's computer and may be used by the agent to answer calls, to answer emails, to engage in chat, to access documents, to rout calls, to manage schedules, to access the Internet, and to preview statistics, among other tasks.

Application 502 may include a telephony (call) interface 503 including a dialing pad and necessary telephony session management controls. An agent may receive and make calls using the desktop application instead of telephone or other handheld. Application 502 may also include an application (APP) interface 504. Application interface 504 provides access to local applications like email, chat, notepad, and other applications. Application interface 504 may also provide agent access to any data attached to or relative to an incoming interaction. Application 502 includes a caller transcript display window 505 containing the transcribed content associated with the call and caller.

Transcription display window 505 may contain an indication of original transcript confidence level. Transcript confidence levels such as "low, medium, or high", for example, may help to alert agents about transcripts that may need corrected. Agents may manually assign new interaction or content tags or correct previously assigned interaction or content tags. In the event of a transcript having low confidence, a popup notification 508 may prompt the agent to review and assign or correct tags. An extension may be provided within application 502 to enable direct communication with a tag server like tag server 118 of FIG. 1. The agent may review all of the tags assigned to the interaction and may also review all tags that may have been assigned to the caller. Application 502 may include a suggestion display 506 that may display system suggestions to an agent that might be handling a problem interaction or to an agent that might be working with a good upsell or cross sell prospect.

Application 502 includes a static or floating tags window 507 that displays all of the agent's tags. An agent may delete add or refine her own tags in some implementations. "My Tags" window may include controls for ordering different tag views such as view all manually assigned tags or view all auto-assigned tags, or view all supervisor assigned tags. Moreover, if an agent has more than one tag group, the appropriate group may be viewed. For example, view my sales tags vs. view my help desk tags. An agent may search for individual tags by typing in a keyword to match with the tag.

A tag representation may include visual evolution of font size for example based on the tag usage statistics. If an agent has resolved many calls for "hardware problem", the tags directly related to "hardware problem" may appear larger than less used tags. Some tags may become obsolete, for example, when an agent transfers into a new function and no longer performs the old function. Tags may also become obsolete if they have no significant usage. Tags may include time stamp information indicating how old the tag is or a time to live (TTL) indication for a tag meant to be temporary. An agent may order different views of tags such as alphabetical order, list based on tag usage or tag assignment frequency. There are many possibilities.

Figure 6:
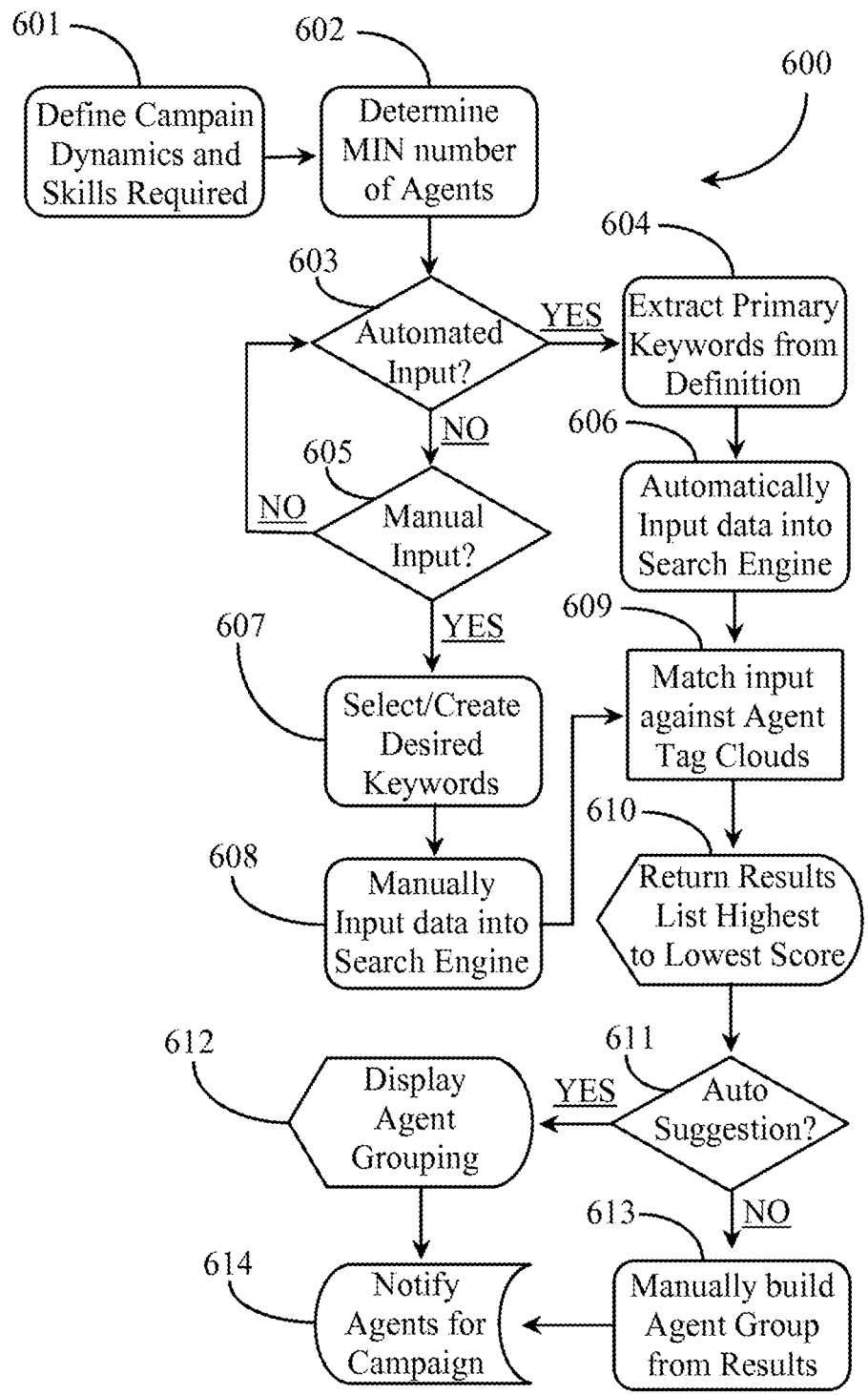
FIG. 6 is a process flow chart depicting acts for gathering agents for a sales campaign.

FIG. 6 is a process flow chart 600 depicting acts for gathering agents for a sales campaign. In one implementation an agent supervisor or other authorized person may quickly discover a best group of agents available to perform a particular task by leveraging tags. The task may be to work a sales campaign such as a scheduled outbound sales campaign or to form an agent group of best qualified agents for handling incoming requests.

Chart 600 provides an example of a process for gathering agents for a sales campaign. The supervisor may, through a desktop application, define the campaign dynamics and skills desired or required of the agents working the campaign at act 601. This definition may include data such as product/service definition, type of outbound campaign (telephone/Web), scheduled date of campaign start and end, definition of the customer list (outbound), and any other important data. The defined skills desired of the agents may vary widely depending upon the type of business and product or service offered during the campaign. One defined skill might be "prior experience in sales of product/service type". Another skill might be defined as "bilingual (English and Spanish)".

The supervisor may determine the minimum (MIN) number of agents desired to work the campaign in act 602. In one implementation the supervisor is empowered to choose whether the system may automatically extract and input keywords or whether manual extraction and input of keywords is desired. The supervisor may elect auto input (YES) in act 603. If the supervisor elects automated extraction and input in act 603, then the process may move to act 604 where the system extracts primary keywords from the supervisor's campaign definition and agent requirements. It is noted herein that primary keywords may include subjects, nouns, verbs, and short phrases. If the campaign is an outbound calling campaign, the keywords "outbound" and "telephone" may be among the keywords extracted from the supervisor's text.

The system automatically inputs the keyword data into a search engine in act 606. The search engine may be a feature of software 119 running on tag server 118 of FIG. 1. The search engine may be adapted to use the keywords to match tags previously assigned to candidate agents who may be available at scheduled time of the campaign. At the tag sever, the system matches input against agent tag clouds or lists in act 609.

If the supervisor does not desire to use automated keyword extraction and search engine input in act 603, the process may move to act 605 where the supervisor may elect to carry out the task manually (YES) at step 605. A NO determination in act 605 causes the process to loop until the supervisor makes a decision or cancels the request. If the supervisor determines to manually extract and input the data in act 605, the process may move to act 607 where the supervisor may select and create the desired keywords to utilize in the agent search. The supervisor manually inputs the data into a search engine interface displayed in the supervisor's desktop application.

In act 609, the system matches the input against the tag clouds or lists attributed to the candidate agents. Metadata (statistics) about individual tags may also be leveraged in addition to the tag meaning to rank agent qualification for the task. For example, if two competing agents have the tags "Outbound" and the correct product or service experience tag, for example, "Apple Notebook" then tag usage statistics or tag assignment frequency statistics may play a determining role in ranking the competing agents. In such implementation one agent may have worked an "Outbound" campaign one time while another may have worked an "Outbound" campaign 100 times wherein the system tags each agent with the tag "Outbound" every time the agent works an outbound campaign. The system may select the agent with higher tag assignment frequency for "Outbound" assuming more experience attributed to the frequency of tag assignment.

The system may return the results after processing in act 610. The results may include agent identification and contact parameters for each agent in the list. In one implementation the returned results may list highest ranking or scoring agents to lowest ranking or scoring agents. Highest scoring agents may be those whose tags match most or all of the keywords input into the search engine taking into account tag assignment frequency, which may be an indication of experience of the agent relative to the tag assigned to the agent and matched leveraging a keyword.

The supervisor may be prompted to make a decision as to whether the system may automatically assemble the agents into a group or whether the supervisor may manually select and group the agents from the returned summary in act 611. If the supervisor elects auto suggestion in act 611, the process may move to act 612 where the system displays the automatically assembled agent group for the supervisor in the supervisor's desktop application. The assembled group may contain the minimum number of agents desired for the campaign plus a statistically relevant padding of extra agents or "reserves" to ensure an adequate or minimum number is available at the time of the campaign and continued optimum service during the busiest periods of the campaign. It is noted herein that the auto-assembled agent group may be manually edited by the supervisor including adding and subtracting agents relative to the agent group.

If the supervisor declines auto suggestion (NO) in act 611, the process may move to act 613 where the supervisor manually builds the agent group from the results list. In either case of auto assembly of agents or manual assembly of agents, the process moves to act 614 where the agents may be notified through workforce scheduling or other agent reservation methods that they may be working the upcoming scheduled campaign. It is noted herein that in an event that the supervisor is displeased with the returned results of act 610, the supervisor may have an option of refining the search by adding to, editing, or deleting parts of the search input and initiating a second search.

In one implementation the process depicted herein may also be used to generate a list of customers for an outbound campaign without departing from the spirit and scope of the present invention. For example, customer tags relative to purchase history, behavior, willingness to engage, last confidence level, etc. may be matched to keyword input where the keywords describe optimum customer attributes desired for the list. Metadata associated with customer tags may also be taken into account during customer ranking in the same way agents might be ranked or scored. In such an implementation the supervisor may set a target number of customers to call during the campaign window.

Figure 7:
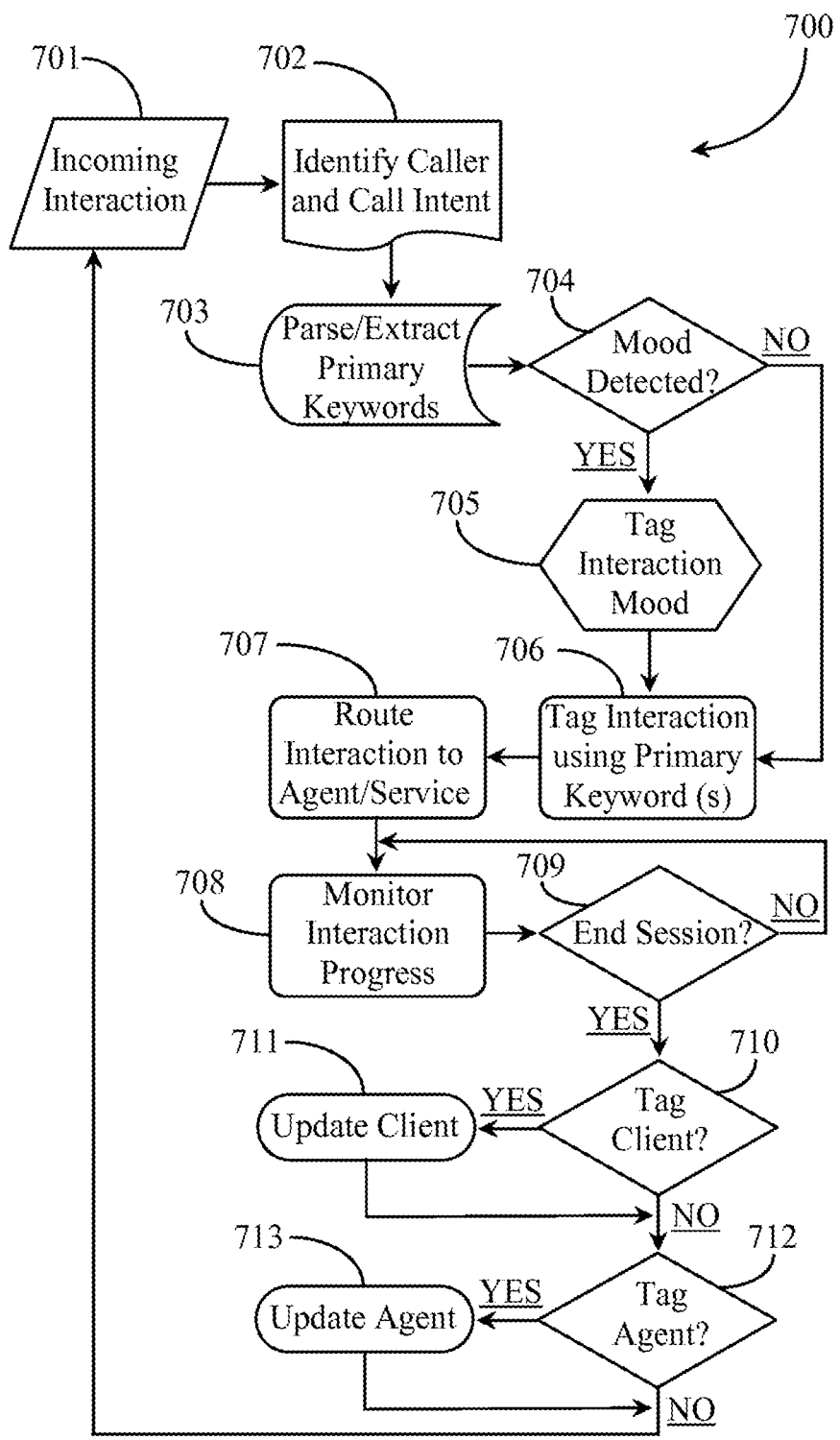
FIG. 7 is a process flow chart depicting acts for auto-tagging interactions and other entities.

FIG. 7 is a process flow chart 700 depicting acts for auto-tagging interactions and other entities (also referred to as resources). Chart 700 depicts acts for interaction tagging and for agent tagging. An incoming interaction arrives at the contact center in act 701. IVR intervention identifies the caller and the intent or purpose of the call. The system parses the interaction content (audio converted to text) for primary keywords that define the content of the interaction between the caller and the IVR in act 703. In one implementation the system may attempt to detect the current mood state of the caller through voice analytics at the IVR. The mood may be detected by recognizing certain utterances, tone, inflection, and the like.

The system may determine in act 704 whether the caller's mood was successfully detected. If the caller's mood was successfully detected during the IVR interaction and confirmed by the system (YES) in act 704, the system may tag the interaction with the current mood state of the caller. If the system could not successfully determine a mood of the caller, or mood detection is not available to the system, the process may skip act 705 and may move to act 706, where the system may tag the interaction with the primary keywords extracted out of the interaction content (audio transcript).

A request along with the tagged interaction data is transmitted to, for example, the router. The request may be for routing instructions. The system may then route the interaction to an appropriate available agent or service based on matching the interaction tags with tags previously assigned to agents or automated services in act 707. During the interaction between the caller and the agent or automated service, the system may monitor the interaction progress in act 708. During this process, the interaction content including agent, service, and caller input may be recorded and rendered parseable for extraction of more primary keywords for later tagging of entities. The system determines whether the session has ended in act 709. If the system determines that the session has not ended and is ongoing in act 709, the process may loop back to the monitoring act.

If the system determines the session has ended, is being ended, or may end shortly in act 709, the system may then determine whether or not to tag the customer or client in act 710. If the system determines that the client should be tagged for future reference, the client tag list may be updated for the client in act 711. If the system determines not to tag the client in act 709 or if the system tags the client and updates the client tagbase, then the system may decide whether or not to tag the agent or other contact center resource involved with the interaction in act 712. If the system determines to tag the agent in act 712, the process may move to act 713 where the agent's tagbase is updated.

Client or customer tags may be grouped into tag clouds in the same way as agent tags. A customer might have two different sets of tags relative to two disparate customer roles in interaction with the contact center. In one implementation tag groups for a customer might be generated separately by two different departments such that one department maintains one tag cloud or tag list for the customer and another department maintains a separate tag cloud or list for the same customer. In such an implementation the differences in the tags may be relative to the different experiences and relationships the customer has with each department. A relationship between two entities may be defined by the intersection of their tags.

Figure 8:
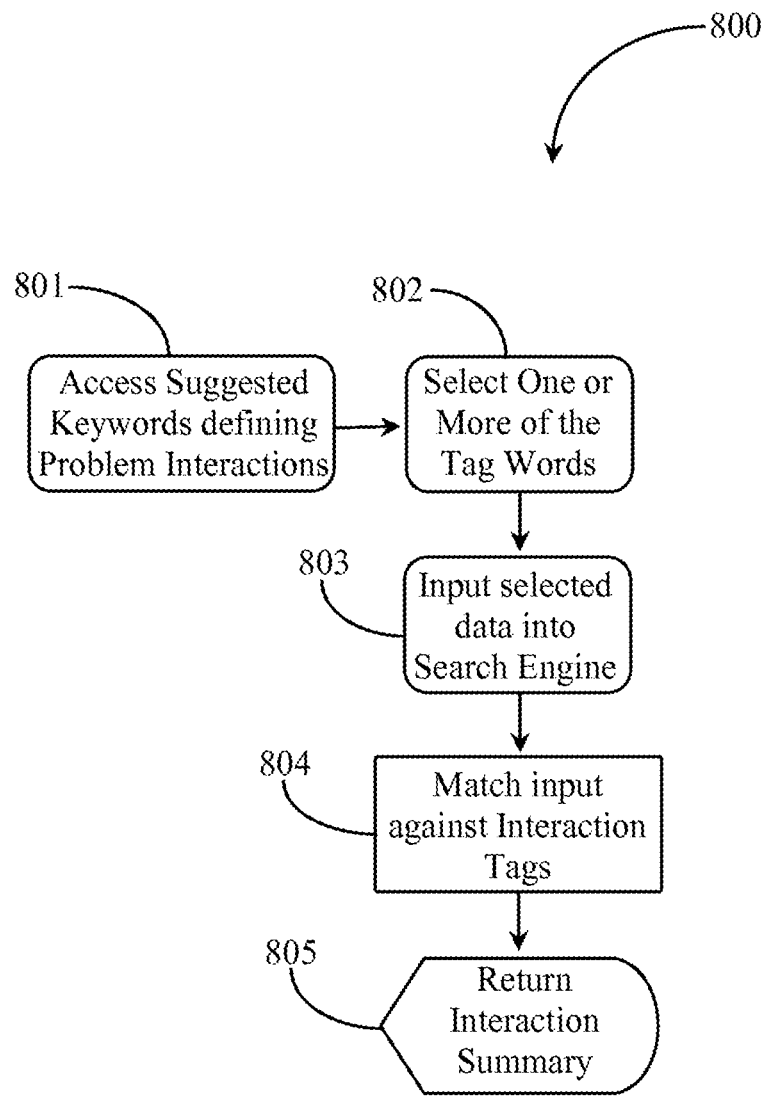
FIG. 8 is a process flow chart depicting acts for filtering problem interactions.

FIG. 8 is a process flow chart 800 depicting acts for filtering interactions for problem interactions. In one implementation analytic processes such as follow-up interaction reviews may be expedited by leveraging tags to search for problem interactions that have occurred during contact center business. A problem interaction might be one where the issue was resolved but the customer was left in a state of dismay or dissatisfaction. Other problem interactions might be those containing unresolved issues or disputes.

A supervisor may, through a desktop application, access system-suggested keywords that might describe certain problems or issues that might occur when interacting with customers in general. The system may maintain a tag cloud of such primary keywords that may have been tagged to such interactions over the course of business. A link to the tag server may be provided in the supervisor's desktop application to enable a search for problem interactions based on keyword matching to interaction tags. A problem tag for an interaction may be general or specific. A general tag may be "customer dissatisfaction" while a more specific tag might be "customer overcharged" or "customer shipping issue" for example. The tag list or cloud accessed in act 801 may be displayed in the supervisor application.

The supervisor may select specific keywords or "tag words" for use in act 802. The supervisor may input the selected data into a search engine interface displayed in the supervisor's application while connected to the tag server in act 803. The supervisor may initiate the search at the tag server where the input data acts like a filter to filter out those problem interactions where the tags match the keyword input. The system matches the input against the interaction tag groups in act 804 for all interactions or for interactions that occurred during a window of time the supervisor might specify in act 801 thereby narrowing the search to specific interactions that occurred within the specified time frame. The system returns the interaction list of matching interactions in act 805 for display in the supervisor's interface on the desktop. In this way, much work browsing through interactions is eliminated and the problems might be resolved much more expeditiously for those customers.

Figure 9:
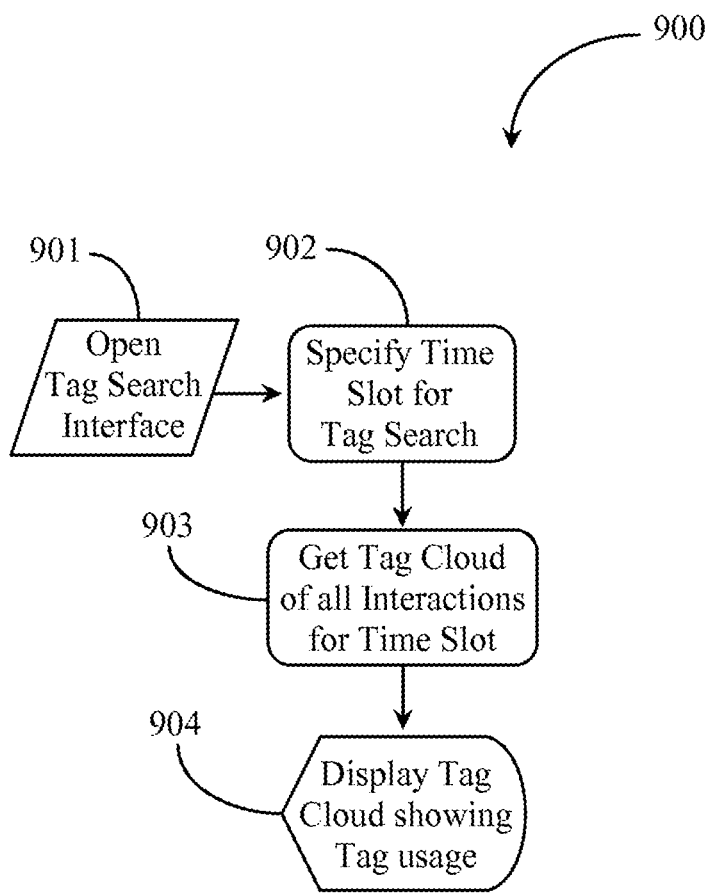
FIG. 9 is a process flow chart depicting acts for determining tag usage for a defined time slot.

FIG. 9 is a process flow chart 900 depicting acts for determining tag usage for a defined time slot. In one implementation a supervisor may order a time-dependant tag cloud representing all of the interaction tags that may have been assigned during a specified time period during the course of contact center operation. A supervisor may open a tag search interface in the supervisor's desktop application while connected to the tag server. The supervisor may specify a time period ranging from a very short period up to a very large period of time in act 902 and may initiate the tag search operation.

The system may retrieve the tag cloud for all interactions as it existed from the start to the end of the time period in act 903. It is noted herein that the search may be customized by department, product, interaction type, etc. One implementation might include searching for the tag cloud of all interactions that occurred as a result of a specific calling campaign for example. The system may display the tag cloud in the supervisor's interface showing the overall tag usage such as the total number of interactions that share a same problem tag such as "shipping problem" for example. In this way, a supervisor or even an automated system might isolate interactions linked to specific problems or unresolved issues.

In one implementation the search may return interactions linked to negative comments made about products or services or agents, etc. In one implementation the process may be used to quickly aggregate customers whom are owed refunds for poor performance or discounts on next purchases to retain loyalty. In one implantation, the same process might be used to isolate positive interactions to determine what customers are saying about products or services or agents or their experiences that may have been documented in short surveys given during their interactions with the contact center. There are many different use cases possible.

The processes discussed with respect to FIGS. 6-9 may be software routines executed by a processor based on instructions stored in memory. The instructions may also be stored in other non-transient computer readable media such as, for example, a CD-ROM, flash drive, or the like. A person of skill in the art should also recognize that the routines may be executed via hardware, firmware (e.g. via an ASIC), or in any combination of software, firmware, and/or hardware. Furthermore, the sequence of steps of each process is not fixed, but can be altered into any desired sequence as recognized by a person of skill in the art.

Figure 10:
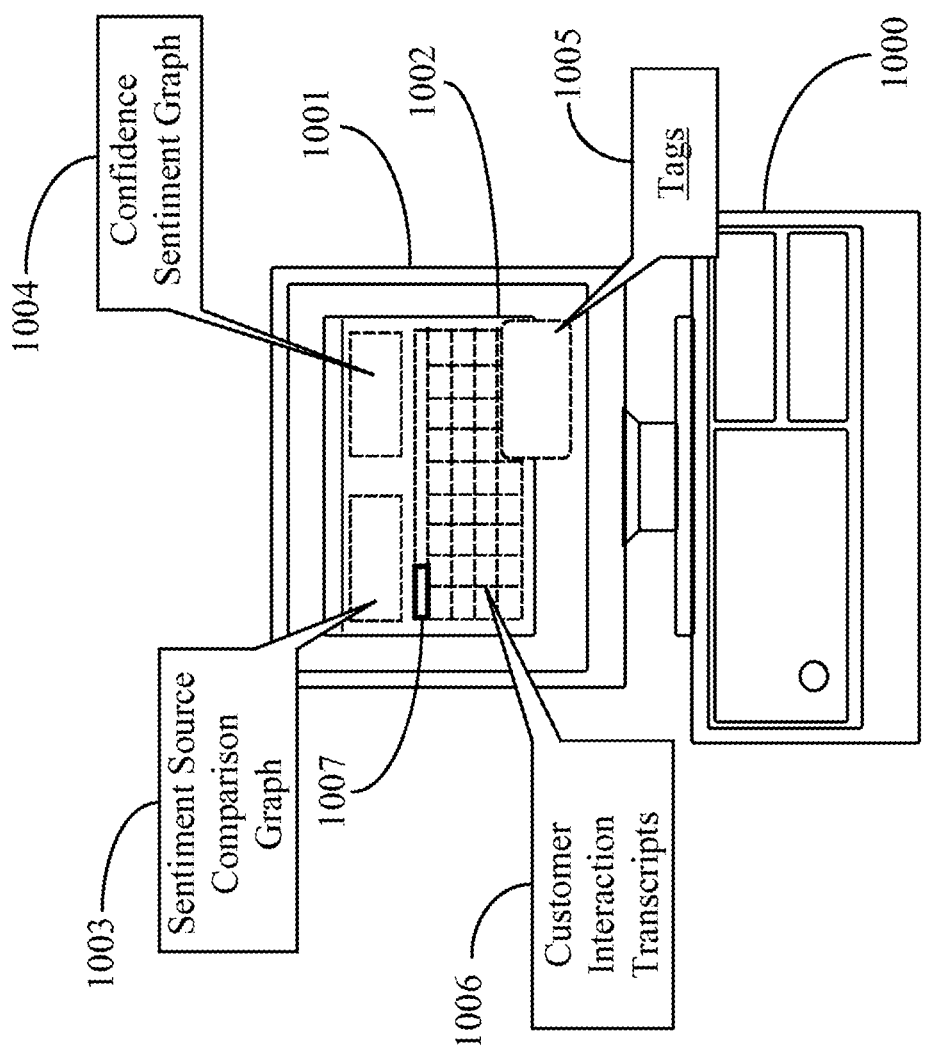
FIG. 10 is an elevation view of a knowledge worker or supervisor desktop computer running a desk top application adapted for working with tags.

FIG. 10 is an elevation view of a knowledge worker or supervisor desktop computer 1000 running a desk top application adapted for working with tags. Supervisor desktop computer 1000 includes a computer display monitor 1001 and may be assumed connected to a contact center LAN as described further above in FIG. 1 (supervisor desktop appliances 117 (1-*n*)). A supervisor desktop application 1002 may be displayed on monitor 1001 and may include a variety of analytic tools and charts that may be custom ordered and reviewed by a supervisor or other qualified personnel in the course of analytical review of contact center business that has transpired.

Application 1002 depicts a sentiment source comparison graph 1003 in this implementation. Sentiment source graph 1003 may be ordered to determine the communication source domain for a specific sentiment documented in interactions received from those source domains. A source domain may be Facebook™, Twitter™, or other domains linked to the contact center via one or more communication channels. In one configuration, the analytic graph displayed may plot the sentiment levels such as "positive", "neutral", and "negative" of interactions that have occurred within the contact center over time with a plotted curve dedicated to each source domain of those domains being analytically compared. Tags may be leveraged to define sentiment levels for each interaction and for determining the source domain of those interactions.

Application 1002 depicts a confidence/sentiment comparison graph, for example, a pie chart quantifying percentages of interactions tagged with a sentiment level and a consumer confidence level. A confidence level can be defined by the tags "confidence excellent", "confidence good", "confidence poor", and "confidence terrible". A supervising agent may gain insight into emerging trends including problems by ordering and viewing such informative chart graphics. Tags may be created for mood states like sentiment or confidence and auto-tagged to each interaction enabling the interactions to be isolated and analyzed as groups of interactions that may be further segregated by interaction source domain, interaction type (sales/service), contact center department, product/service type, and so on.

Application 1002 may include an interface 1006 displaying customer interaction transcripts 1006 that may be ordered based on tag search filtering. A filter constraint dialog box 1007 is provided for the analysis of customer transcripts. A user may type a filter tag word like "order delivery" to receive a list of customer interaction transcripts 1006. List 1006 may be scrollable and may contain several columns of information like the original audio voice recordings, indication of confidence level, indication of mood or sentiment, a transcript of the original audio file, corrected transcript, and annotations or "tags".

In some implementations corrected transcripts are provided by analytics workers improving the documentation of primary keywords. An original transcript may, for what ever reason, be spotty if certain keywords were not successfully collected from the customer interaction. Imperfect transcriptions may be manually corrected to show full content. The system may return transcription list 1002 based on known information such as a tag word input into filter dialog box 1007. In one implementation a supervisor may, without filter, display all interactions and call up a tag cloud for all of the customer interactions that indicates tag evolution relative to number of times assigned or used. The supervisor may glean information in this manner such as "What is the hottest topic today"?; "What are the hot products today"?; or "What are the customers saying".

It may be apparent to one with skill in the art that the tag-centric system of the invention may be provided using some or all of the mentioned features and components without departing from the spirit and scope of the present invention. It may also be apparent to the skilled artisan that the implementations described above are specific examples of a single broader invention which may have greater scope than any of the singular descriptions taught. There may be many alterations made in the descriptions without departing from the spirit and scope of the present invention.

What is claimed is:

1. An apparatus comprising:
a processor; and
a memory, the memory storing instructions that when executed by the processor cause the processor to:
 identify an interaction;
 identify a keyword from machine-readable text;
 identify a contact center resource based on the identified keyword;
 update a first group of keywords associated with the contact center resource based on the identified keyword;
 based on analysis of the keyword associated with the contact center resource, select the contact center resource pursuant to a frequency of the keyword being associated with the contact center resource;
 route the interaction to the selected contact center resource so to establish communication with the contact center resource;
 monitor the selecting of the contact center resource and the routing of the interaction and report results in response; and
 update a second group of keywords according to analysis of the results.

2. The apparatus of claim 1, wherein the second group of keywords is associated with a contact center client or second contact center resource.

3. The apparatus of claim 1 wherein the text is derived from a communication session between a client and the contact center resource, wherein the instructions further cause the processor to:
 tag the communication session based on the identified keyword.

4. The apparatus of claim 1 wherein the text further includes text associated with a communication session between the contact center resource and a supervisor of the contact center.

5. The apparatus of claim 1 wherein the text is converted from an audio recording.

6. The apparatus of claim 1 wherein the contact center resource is a contact center agent, contact center product, or contact center service.

7. The apparatus of claim 1, wherein the instructions further cause the processor to:
 search to discover entities based on the identified keyword.

8. An apparatus comprising:
a processor; and
a memory, the memory storing instructions that when executed by the processor cause the processor to:
 identify an interaction;
 identify a keyword from machine-readable text;
 identify a contact center resource based on the identified keyword;
 update a first group of keywords associated with the contact center resource based on the identified keyword;
 based on analysis of the keyword associated with the contact center resource, inferring relationships between certain entities pursuant to similarity evidenced through comparing associated keywords attributed to those entities; and
 routing the interaction to the contact center resource so to establish communication with the contact center resource.

9. The apparatus of claim 8, wherein the keyword reflects a skill possessed by a contact center agent.

10. The apparatus of claim 8, wherein the instructions further cause the processor to provide search engine functionality to discover problem interactions based on the keyword.

11. The apparatus of claim 8, wherein the keyword reflects sentiment or mood of a contact center client or contact center agent.

12. The apparatus of claim 8, wherein the instructions further cause the processor to infer an interaction topic based on historical record of frequency of use of the keywords relative to those topics.

13. A method comprising:
identifying, by a processor, an interaction;
identifying, by the processor, a keyword from machine-readable text;

identifying, by the processor, a contact center resource based on the identified keyword;
updating, by the processor, a first group of keywords associated with the contact center resource based on the identified keyword;
selecting, by the processor, based on analysis of the keyword associated with the contact center resource, the contact center resource pursuant to a frequency of the keyword being associated with the contact center resource;
routing the interaction to the selected contact center resource so to establish communication with the contact center resource;
monitoring, by the processor, the selecting of the contact center resource and the routing of the interaction and reporting results in response; and
updating, by the processor, a second group of keywords according to analysis of the results.

14. The method of claim 13, wherein the second group of keywords is associated with a contact center client or second contact center resource.

15. The method of claim 13, wherein the text is derived from a communication session between a client and the contact center resource, the method further comprising:
tagging the communication session based on the identified keyword.

16. The method of claim 13, wherein the text further includes text associated with a communication session between the contact center resource and a supervisor of the contact center.

17. The method of claim 13, wherein the text is converted from an audio recording.

18. The method of claim 13, wherein the contact center resource is a contact center agent, contact center product, or contact center service.

19. The method of claim 13, wherein the keyword reflects a skill possessed by a contact center agent.

20. The method of claim 13, wherein the keyword reflects sentiment or mood of a contact center client or contact center agent.

* * * * *